United States Patent [19]
Kolb et al.

[11] 3,808,601
[45] Apr. 30, 1974

[54] SHORT DOWN-HOLE RECORDING PRESSURE OR TEMPERATURE GAUGE

[75] Inventors: James H. Kolb; Harold S. Field, both of Tulsa, Okla.

[73] Assignee: Geophysical Research Corporation, Tulsa, Okla.

[22] Filed: June 28, 1972

[21] Appl. No.: 268,229

[52] U.S. Cl.............. 346/33 TP, 73/343.5, 73/391, 346/126, 346/138
[51] Int. Cl. ........................................... G01d 9/12
[58] Field of Search .... 346/33 WL, 33 TP, 72, 127, 346/126, 125, 138; 73/300, 343.5, 391, 151

[56] References Cited
UNITED STATES PATENTS
1,837,222  12/1931  Kannenstine ........................ 73/300

*Primary Examiner*—Joseph W. Hartary
*Attorney, Agent, or Firm*—Head & Johnson

[57] ABSTRACT

This invention describes an improved type of bottom hole pressure and temperature recording gauge, useful for measurements in deep bore holes in the earth. It is designed particularly for use in offshore wells where tools are pumped down the tubing, and a requirement of small diameter and short length is mandatory. As in the case of the conventional wire line bottom hole temperature and pressure gauges, this instrument includes a clock driven lead screw assembly, a chart holder assembly attached to a nut which rides in the lead screw assembly, a Bourdon tube, a stylus attached to the Bourdon tube at its free end and a bellows arrangement to seal the liquid in the Bourdon tube from contact with the well fluid. However, instead of having all of these elements in longitudinal, series, arrangement, several of them are placed, one inside of the other, so that the length of the instrument can be reduced very markedly from the conventional design.

5 Claims, 4 Drawing Figures

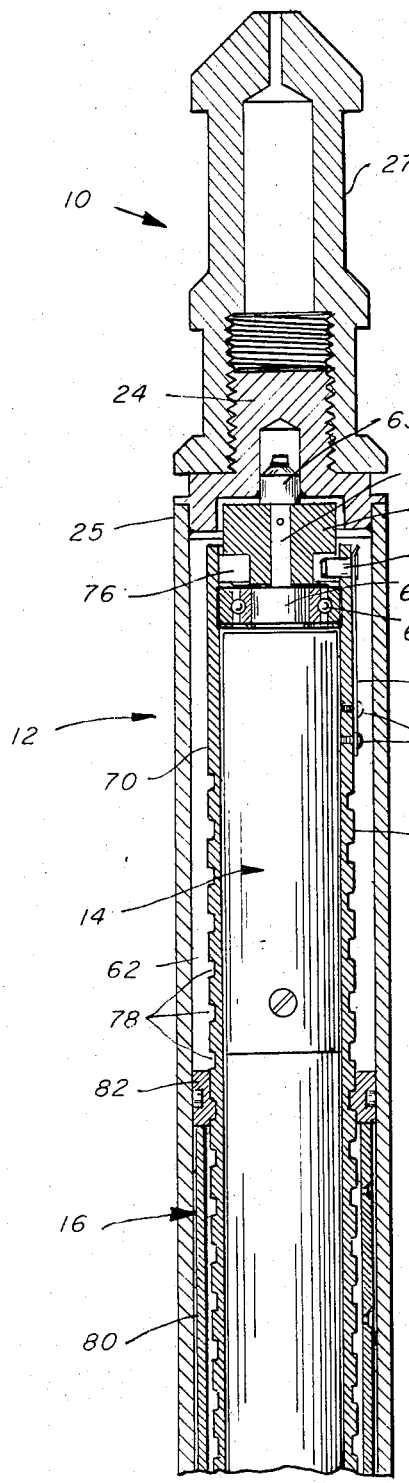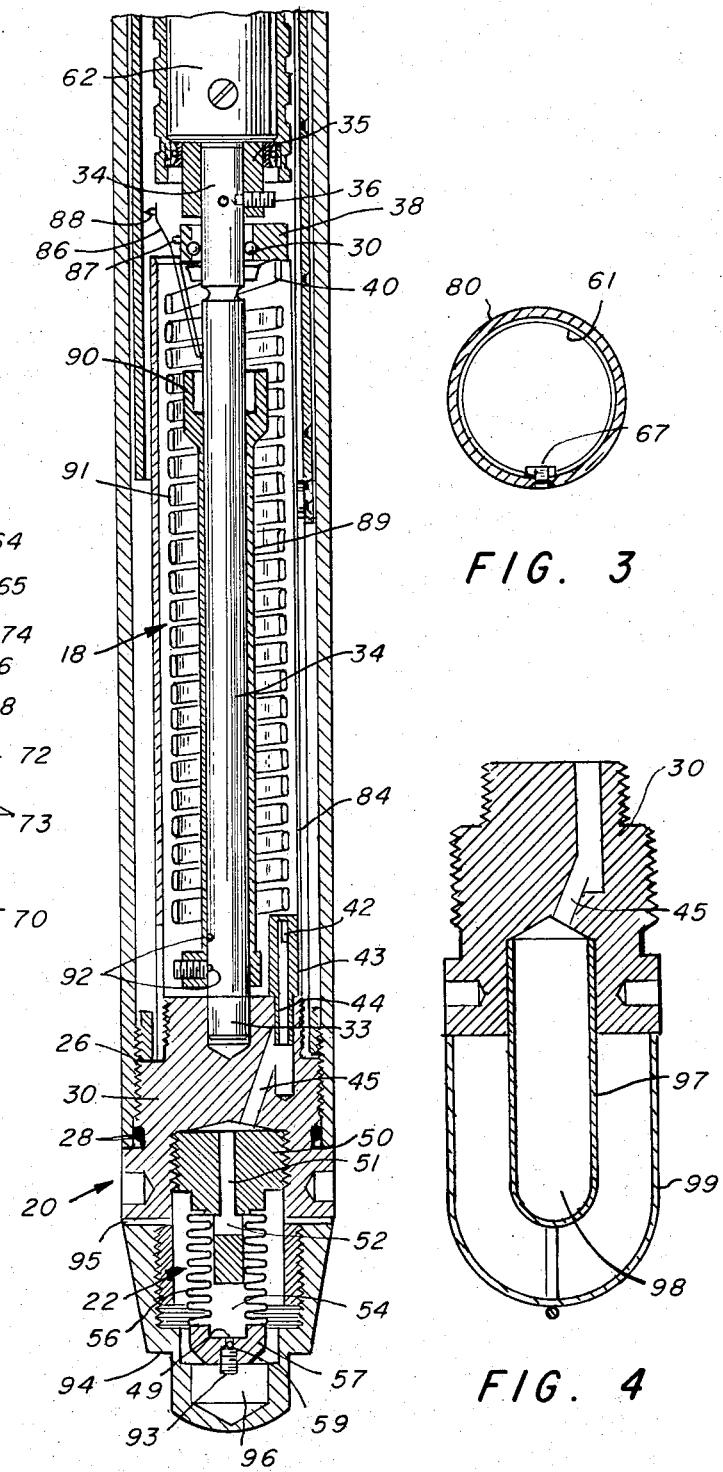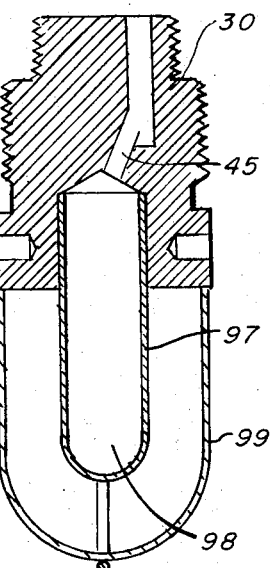

SHORT DOWN-HOLE RECORDING PRESSURE OR TEMPERATURE GAUGE

CROSS REFERENCE TO RELATED PATENT AND APPLICATION

This invention is related to the Amerada type pressure and temperature gauges described in U.S. Pat. No. 1,837,222. It is also related to the copending U.S. Pat. application of the same assignee, Ser. No. 267,003, filed June 28, 1972, entitled IMPROVED PRESSURE GAUGE now U.S. Pat. No. 3,744,307.

BACKGROUND OF THE INVENTION

This invention lies in the field of bottom hole temperature and pressure measurements. More particularly, it is concerned with a design of an instrument that can be used in offshore wells, where, because of the limitations of well head equipment the instruments must be of a diameter less than a maximum specified diameter, and shorter than a specified length, so as to have free passage through the curved flow lines which serve the offshore well locations.

Down hole recording pressure and temperature gauges, such as the Amerada type gauges described in U.S. Pat. No. 1,837,222 are devices that have long been used and have been recognized throughout the petroleum industry as reliable, dependable and accurate instruments. These instruments, however, were designed for, and have always been used in, oil and gas wells and similar applications where available space exists in sufficient length to accommodate more than 6 feet of straight length of the conventional instrument.

In more recent years, oil and gas well completions have changed in some instances, particularly in subsea well completions, where the tubing which passes into the well must contain a portion that is sharply curved. The curved portion of these tubing systems may be as small in diameter as two inches inner diameter and may have a bend radius as small as 5 feet. These dimensions definitely preclude the passage of a normal 6 foot long recording pressure/temperature gauge, and require an entire redesign in order to provide an instrument which can be used in these offshore well locations.

Another problem of the prior art long instruments, is that in many wells where there is a high gas pressure in the well bore, it is necessary to introduce the instruments through a device at the well head, called a lubricator. This device must be of a length greater than the length of the pressure recording instrument, and possibly greater than the length of a pressure instrument and a temperature instrument which may be joined in tandem. It may often be necessary also to include a third section including a weight, which is required in order to force the instruments into the well bore against the pressure of the gas in the well bore. With long instruments this often requires a lubricator of the order of 15' – 20' or more in length. This requirement makes the handling of the lubricator and of the instruments difficult, time consuming and expensive. By the use of a short instrument such as the instrument of this invention, a correspondingly short lubricator, of the order of six feet may be used with a pressure/temperature instrument. This can all be handled by a single person in a very rapid manner with a consequent saving in time and money and with less chance of danger to the individual.

SUMMARY OF THE INVENTION

It is a principal object of this invention to provide a design of bottom hole temperature and pressure recording gauge that is short enough and of small enough diameter to be used as an "in the flow line" instrument for well measurements at offshore well locations.

It is a further object of this invention to provide a short length instrument for bottom hole pressure and temperature recording measurements, which will have equal accuracy to the conventional long Amerada type instruments of the prior art. These objects are realized and the limitations of the prior art are overcome in this invention by placing the Bourdon tube and the clock drive mechanism immediately adjacent, and utilizing a lead screw assembly which is cut in the exterior surface of a tube which surrounds the clock mechanism, rather than using a rod, which is in tandem with the clock mechanism. The chart holder assembly is placed outside of the lead screw assembly with a nut on the former engaging in the helical groove cut into the outer surface of the lead screw assembly. The stylus is mounted on a spring means which is attached directly to the top, free end, of the Bourdon tube. This free end is guided by a ball bearing about an axial rod or shaft which is fastened to the base of the instrument. The bottom or fixed end of the Bourdon tube is also fastened to this base. A bellows assembly is fastened to the bottom of the base and provides the means of compensating for the change in volume of liquid in the Bourdon tube under varying pressure conditions.

BRIEF DESCRIPTION OF THE DRAWINGS

These and other objects of this invention and a better understanding of the principles and details of the invention will be evident from the following description taken in conjunction with the appended drawings, in which:

FIG. 1 shows the top half of the instrument.

FIG. 2 shows the bottom half of the instrument.

FIG. 3 shows a cross-section through the chart holder and chart; and

FIG. 4 shows the part of the temperature recording instrument that converts temperature to pressure.

DESCRIPTION OF THE PREFERRED EMBODIMENT

Referring now to the drawings and in particular to FIG. 1, the numeral 10 indicates generally the top of the instrument which is a wire line socket 27. It can also be a ball and socket termination (not shown) for use in offshore well applications. Numeral 12 indicates generally the outer case assembly. Numeral 14 indicates generally the clock drive assembly. Numeral 16 indicates generally the lead screw and chart holder assembly. Numeral 18 indicates generally the Bourdon tube assembly. Numeral 20 indicates generally the base portion of the instrument. Numeral 22 indicates generally the bellows portion of the instrument.

Numeral 12 indicates generally the case of the instrument. This comprises an outer tube 25 which is fastened to a top plug portion 24 of the instrument, as by welding or brazing. The upper termination of the instrument 10 comprises either a wire line socket 27 as indicated, which screws to the upper plug portion 24 of the instrument, or other conventional attachment means. The lower end of the case tube 25 is threaded into a base portion shown generally by the numeral 20. The tube is threaded to the base portion 30, and has in addition a seal 28 between the tube and the base.

The clock and chart drive mechanism indicated generally by 14 includes a clock mechanism 62 which is fastened at its bottom end by a hub 35 to an axial support rod 34, which is supported at 33 in the base portion 30. The hub 35 is a secure fit on the rod 34 and is held in position by means of set screws 36. The output shaft 64 of the clock drive is at the top of the clock mechanism, and is pinned to a hub 65, which has a number of radially drilled openings 76. The chart drive lead screw 70 is supported on two bearings 68, 68' which are supported on hubs 66 and 35 attached to the clock case. This chart drive lead screw 70 is a tube which completely surrounds the clock mechanism and has a helical groove 78 machined in its outer surface. There is a leaf spring 72 which is fastened to the lead screw by means such as screws 73. This spring 72 has a small pin 74 at its free end, which passes through an opening in the chart drive and into one or the other of the drilled openings 76. Thus, pin 74, spring 72 and the opening 76 permit the clock shaft 64 to drive the chart drive lead screw 70.

In the conventional system the lead screw is an axial rod or shaft which extends longitudinally from the clock drive. A nut rides in the helical thread on the outside of this shaft, to drive the chart holder. In this design the lead screw is on the outer surface of a thin cylindrical shell which surrounds the clock mechanism.

The chart holder 80 is a thin cylindrical shell larger in diameter than the lead screw and surrounding the lead screw. There is a short length 82 of the chart holder which is of smaller inner diameter and is adapted to fit into the helical grooves 78 of the lead screw. This part 82 acts as a lead screw nut, and as the lead screw turns, the chart holder is driven downwardly with the nut following the helical groove. The chart holder is guided on its inside surface by a tube 84 which is fastened by threads to the base portion 30. This is to guide the chart holder so that it does not press outward against the case where friction might prevent its accurate movement, and to maintain it in concentric relation to the upper end of the Bourdon tube. The chart holder is of larger diameter than the guide tube 84 but is spaced from the guide tube by means of three shallow buttons, two of which press on the outside surface of the guide tube and a third one of which presses in a slot milled longitudinally in the outside of the guide tube. This slot keeps the chart holder from turning, and converts the rotating motion of the lead screw into a correspondingly longitudinal motion of the chart holder.

Numeral 18 indicates generally the pressure measurement portion of the instrument. This comprises a helically wound Bourdon tube 91 which is fastened at its lower end to the base portion 30 by means of post 43. The opening 42 in the Bourdon tube communicates by channel 44 down to and through opening 45 in the base portion 30 to the bellows portion 50. There it communicates with a central opening 51 and through a central post opening 52 into the inside of the bellows 56. The inner bellows space is indicated as 54. There is a downward projecting portion 57 of the bellows structure which has a central opening 49. This opening is closed by a set screw 93 pressing on a spherical ball 59 which is used to close off the opening. This opening 49 is the means by which the Bourdon tube is filled with hydraulic liquid. This is done by evacuating the internal space of the bellows and the Bourdon tube and permitting clean hydraulic liquid to flow into the Bourdon tube and the bellows space. After filling, the ball 59 is put in place and locked there by means of the set screw 93.

The upper end of the Bourdon tube 40 is closed. It is supported on the outer race 38 of a bearing 30 which is supported on the central axial post 34. This outer race 38 also supports a spring 86, which is fastened to it by screws 87. The outer end of the spring 86 carries the stylus 88 which presses outwardly against the inner surface of the chart, which is placed inside of the chart holder. The spring 86 is required to provide the proper amount of pressure of the stylus against the chart. However, as the chart holder is moved down in the initial assembly of the instrument, the stylus must be pushed back from contact with the inner surface of the chart holder. This is done by means of a long tube 89 which surrounds the central post 34. It has a wide flange 90 at the upper end which, as the tube is pushed upward, presses the spring 86 back, and permits clearance between the stylus and the chart holder. In this position, the lower end of the tube is held in either one of two detent positions 92. In the assembly of the instrument the tube 89 is held in the upper detent position until the chart holder has been lowered to a point below the stylus. Then it is moved to the lower detent position which permits the spring then to press the stylus against the chart.

At the upper end of the clock shaft 64 is a centering plug 63 which is a tapering plastic cylinder, which permits the guiding of the upper end of the instrument centrally as the instrument is assembled by dropping the case over the clock mechanism, etc. Thus the clock mechanism and the associated lead screw and chart holder are supported between the central post 34 and the centering plug 63 so that there will be adequate clearance between the case and these parts of the instrument. Similarly, the Bourdon tube assembly is held with its lower end fastened to the base of the instrument and its upper end held centered by the ball bearing 30 about the central post 34.

In use, one of the last things that needs to be done is to remove the cap 94 which surrounds the bellows, and fill the internal space 96 with clean liquid. The cap is then lifted and screwed onto the threads of the base portion 30. The excess of liquid will flow out through apertures 95, so that the space 96 will essentially be full of clean liquid. Then when the instrument is lowered into the well, well fluids will communicate through apertures 95 with the liquid in the space 96 and will correspondingly apply pressure to the bellows and to the Bourdon tube.

In FIG. 3 is illustrated very simply a cross-section of the chart holder 80. This is a cylindrical tubular shell with a ridge 67 passing longitudinally up the inside. The purpose of the ridge is to help to locate, and center the chart sheet 61 and to prevent its turning with respect to the chart holder 80.

The chart 61 is of a standard construction which comprises a thin sheet of brass shim stock which is painted with a lubricating paint containing graphite or molybdenum disulfide in a carrier. This is painted onto the brass in a thin layer and then baked. This baked coating is hard and has a matt finish. However, the stylus has a rounded polished point which tends to provide a burnished trace of very narrow width. This trace of burnished area is polished and contrasts with respect to the matt finish of the painted surface. The trace can readily be distinguished, and precise measurements can be made of the amplitide of the trace (pressure) with respect to the position along the chart (time).

In FIG. 4 is illustrated a base portion which is designed for use in a temperature measuring bottom hole instrument. In this case the Bourdon tube is identical with the one described in FIG. 2. However, in place of the bellows there is a container 97 which contains a volatile liquid 98 with which the Bourdon tube and the container are filled. As the temperature varies in the bottom hole fluids, the temperature is communicated to the container 97 and to the liquid inside. The liquid is chosen to have a vapor pressure, at the temperatures to be measured, within the range of recording of the Bourdon tube. Actual liquids that are used involve a number of lighter hydrocarbons and freons. A wide range of liquids are available so that the vapor pressure recordable by the instrument can be adjusted to any desired range of operating well bottom hole temperature. A rigid cage 99 is provided to protect the container 97.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a pressure/temperature recording instrument for use in deep bore holes, including clock means, chart drive means, chart means, pressure sensor means and stylus means, the improvement comprising:
   a. case means including cylindrical base means;
   b. Bourdon pressure measurement means supported at its base end to said base means;
   c. central post means inside said Bourdon means supported by said base means;
   d. the upper end of said Bourdon means guided by said post means and carrying stylus means for engaging said chart means;
   e. clock means supported at its bottom end on said post means adjacent said stylus means;
   f. tubular lead screw means surrounding said clock means and rotatable in bearings supported by said clock means, the outer surface of said tubular lead screw means carrying a helical groove, and means to drive said lead screw means from said clock means;
   g. chart holder means comprising a tubular shell with means to hold a chart sheet against the inside surface of said holder means, said chart holder means surrounding said lead screw means, and lead screw nut means at the upper end of said chart holder means to engage said helical groove; and
   h. means to guide the lower end of said chart holder means and prevent its rotation.

2. The recording instrument as in claim 1 including means to cause said stylus to be retracted from contact with said chart.

3. The pressure recording instrument as in claim 1 including bellows means to transmit pressure to the clean liquid in said Bourdon means and to isolate said clean liquid from the well fluids.

4. The temperature recording instrument as in claim 1 including means attached to said base means for converting well fluid temperature to a corresponding pressure.

5. The recording instrument as in claim 1, including means to guide the top end of said clock means to the center of the inside top of said case means.

* * * * *